United States Patent Office 3,407,059
Patented Oct. 22, 1968

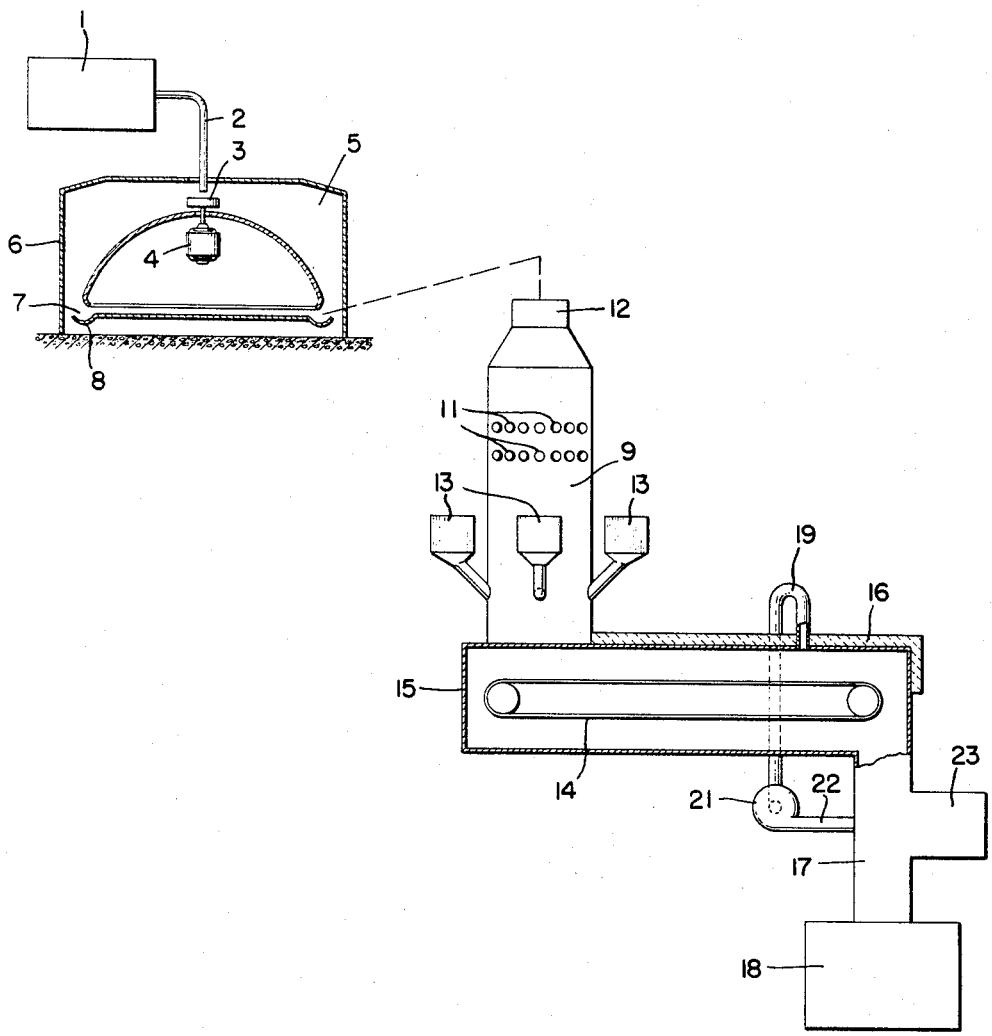

3,407,059
REDUCING A MIXTURE OF ORES AND CARBON
Emil Blaha, Cheltenham, Pa., assignor to Selas Corporation of America, a corporation of Pennsylvania
Filed Apr. 22, 1965, Ser. No. 449,964
5 Claims. (Cl. 75—33)

ABSTRACT OF THE DISCLOSURE

This invention relates to a method for the reduction of ore and includes pelletizing the ore, dropping the pellets through a tower furnace to heat them to reaction temperature, mixing carbon with the hot pellets so a reduction reaction will occur, collecting and holding the mixture of carbon and pellets on a conveyor until the ore is substantially reduced, and separating the reduced metal from ash when the reaction is completed.

---

The present invention relates to the reduction of metallic ores, and more particularly to the reduction of iron ore.

It is well known that the reduction of iron ore can take place in the presence of carbon when heated to temperatures in the range of 1600° F. to 2200° F. In carrying out a process of this type, however, it has been difficult to obtain uniform and complete reduction of the ore.

It is an object of the invention to provide a method for the reduction of ore to metal. A more particular object of the invention is to provide a process for the direct reduction of iron ore to iron.

In carrying out the invention, the ore is crushed, pelletized and heated to reaction temperature. The heated ore is then mixed with finely divided carbon, such as coal, and held until the reaction is complete. The reduced ore can then be melted down.

The various features of novely which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

The single figure of drawing shows schematically apparatus that can be used in practicing the invention.

In carrying out the invention, the ore, which is usually in the form of various oxides of iron, is ground to a fineness from 50 mesh to fines. Preferably the ore is small enough to pass a standard 100 mesh sieve. The ground ore is then mixed with enough water to make a putty-like mass. Most ores have enough clay in them so that they will form a plastic mass without the addition of other material, but it may be necessary to add up to a maximum of 10% bentonite or other clay to obtain this condition. Additionally, ground lime or dolomite may be added to the mixture if it is desirable to have a flux at later stages in the process.

There is shown in the drawing a box 1 which represents the grinding and mixing apparatus above described. The plastic, putty-like mass is forced from mixer 1, by a suitable pump, through a pipe 2 to be deposited in a "slinger" head 3 that is driven by a motor 4. The slinger serves to extrude the mass and make it into small particles in a manner described in the patent of E. A. Siemssen, No. 3,259,171. As described therein, the slinger consists of a cylindrical chamber having its periphery formed of a perforated band, with the perforations being the same size and varying from about .020″ to .0625″ in diameter. For most cases in the preparation of ore, the perforations are .040″ in diameter. As the slinger is rotated at high speed, the plastic mass is extruded by centrifugal force through the perforations, and broken off in small particles of a length two or three times the diameter. The particles are substantially uniform in size. The particles are thrown out by a slinger 3 outwardly into a circular chamber 5 of a building 6 of suitable diameter and are dry by the time they have fallen to the bottom of the chamber. From there they move through slot 7 to be collected on a circular belt 8. The small, solid particles of substantially the same size contain ore in substantially equal amounts, so that their treatment will result in a uniform product. Particles may be stored, or removed directly to further steps of the process.

The next operation performed on the ore particles is to heat them to a temperature sufficient to sustain a reducing reaction. This heating can be accomplished in any convenient manner. It is preferred, however, to use a tower furnace of the type disclosed in Blaha Patent 3,071,357. Accordingly, the small ore particles are moved from storage, or directly from collecting belt 8, to the top of a tower furnace 9, and dropped through the furnace. Furnaces of this type, as explained in the above-mentioned patent, are provided with an unobstructed, vertically extending furnace chamber that is heated by a plurality of rows of burners 11, and usually has an upper preheating portion 12. As the ore particles fall through the furnace they are individually and uniformly heated to a temperature in the range of from 1600° F. to 2200° F. or higher.

A reducing reaction will take place when the ore particles are contacted with carbon. This carbon can be obtained from any available source and may be obtained from natural gas, which will crack and deposit carbon at the temperature of the particles. In most cases, however, it is desirable to use coal as the source of carbon because of its cost and availability. The reducing reaction requires time at temperature. At lower temperatures, the time required for the reaction is quite long, whereas at higher temperatures the particles have a tendency to sinter. It is preferred, therefore, to heat the particles so that they will be from 1800° F. to 1900° F. when they leave the furnace.

Finely ground coal, which is preferably preheated, is mixed with the hot ore particles as they leave the bottom of the furnace. As shown herein, the powdered coal is placed in a plurality of hoppers 13 which are located around and discharge into the lower portion of the furnace. The powdered coal and hot ore particles are intimately mixed as they leave the furnace and are collected on a horizontally moving conveyor 14. The quantity of coal used is slightly more than that required for a stoichiometric reaction with the metal in the ore. This amount can be determined by a prior analysis of the ore. As the ore pellets and coal fall from the furnace, they are collected on a horizontally extending conveyer belt 14.

The reduction reaction between iron ore and carbon of the coal is exothermic and will continue to completion when the reactants have been brought up to temperature. The reaction is a diffusion type, so that it is facilitated by the small particles of uniform size and the intimate mixture of ore and coal. Since the reaction is carried out as a result of bringing the hot particles and carbon together, the layer of this mixture can be built up on the conveyor to a thickness of two or three feet if desired. The diffusion reaction, at the temperatures used will require from 2 to 3 hours to go to completion. Therefore, the conveyor should be of a length and travel at a speed so that the individual particles will be retained on it for this period of time.

The conveyor belt 14 will be made of heat resisting material, and can very well be of the caterpillar type with refractory plates. A casing 15, at least the upper portion 16 of which is insulated, surrounds the conveyor. This casing serves to retain the heat during reaction and prevents air which could reoxidize the ore from coming in contact with the materials while the reaction is being carried out. When the reaction is completed the material on the belt consists of pellets of substantially pure iron, ash and some unreacted coal and impurities. The material is substantially unagglomerated and in particle form.

As the reacted material and ash leave the right end of conveyor 14 they will fall downwardly through a duct 17 into a collection apparatus 18. As the material is still hot it must be protected from the atmosphere until such time as it is below oxidizing temperature or about 800° F. As the material is falling, it can be cleaned of ash by blowing a stream of a non-oxidizing gas across it. Since CO is non-oxidizing and is a product of the reducing reaction, a sufficient quantity of this gas for cleaning purposes can be obtained by withdrawing it from casing 16 above the conveyor. For this purpose a pipe 19 leads from the casing to a hot fan 21. The fan withdraws gas from the casing and blows it in a sheet from duct 22 across the stream of falling particles. The iron pellets will continue to fall while the ash, which is much lighter, will be blown through an outlet 23 to some suitable gas cleaning apparatus.

The substantially pure iron particles that are collected at 18 can be cooled and briquetted before further use. It is preferred, however, to deliver the particles directly into a melting furnace. In this fashion the heat of the pellets can be used to help in the melting process.

By preparing the ore in small particles of substantially the same size that are capable of retaining their size and shape during handling, and heating each particle to substantially the same temperature, and mixing them with powdered coal, reducing reaction can be carried out in a reasonable time.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of reducing iron ore which comprises forming the ore into small pellets of substantially uniform size and shape by extrusion, feeding the pellets to the top of a vertical furnace, heating the pellets as they are falling freely through a furnace to a temperature within the range of 1750° F. to 1900° F., mixing the hot pellets with powdered carbon in substantially stoichiometric proportions while they are falling through the furnace, collecting the hot pellets and carbon on a conveyor, the hot pellets and carbon reacting to reduce the iron ore, retaining the mixture on said conveyor until the reaction is substantially complete, and separating the ash produced by the reaction from the reduced ore.

2. The method of claim 1 in which the ore is mixed with a minor portion of a plastic material and moistened sufficiently to make a putty-like mass, forming the mass into the small particles by extrusion, and drying the particles.

3. The method of claim 1 in which the ash is removed from the refined ore by dropping the refined ore and ash from the conveyor and blowing a non-oxidizing gas through the falling ore and ash to remove the ash therefrom.

4. The method of reducing iron ore which comprises moistening the ore sufficiently to form a putty-like mass, extruding said mass to form small particles of substantially the same size and shape, drying said particles, moving a supply of said particles in a free fall vertically downward through a heated zone and heating them to a temperature sufficient for a reducing reaction to take place, mixing said heated particles with at least a stoichiometric amount of finely ground coal while they are falling so that a reducing reaction will occur, collecting said heated particles and coal on a conveyor, retaining said mixture on said conveyor in an atmosphere of gases resulting from the reaction until the reaction is substantially complete, and separating the reduced iron from the other products of the reaction.

5. The method of claim 4 in which the putty-like mass is formed into particles generally cylindrical in shape having a diameter of from .0625" to .020" and a length of from two to three times their diameter.

References Cited

UNITED STATES PATENTS

| | | | |
|---|---|---|---|
| 2,620,267 | 12/1952 | Kern | 75—3 |
| 2,767,076 | 10/1956 | Taylor | 75—34 |
| 2,792,298 | 5/1957 | Freeman | 75—33 X |
| 2,806,779 | 9/1957 | Case | 75—33 |
| 2,855,290 | 10/1958 | Freeman | 75—33 |
| 3,029,141 | 4/1962 | Sibakin et al. | 75—33 X |
| 3,140,169 | 7/1964 | Smith et al. | 75—35 X |
| 3,180,725 | 4/1965 | Meyer et al. | 75—33 |
| 3,197,303 | 7/1965 | Collin | 75—33 |
| 3,215,521 | 11/1965 | Meyer | 75—36 X |
| 3,224,871 | 12/1965 | Collin | 75—36 X |

L. DEWAYNE RUTLEDGE, *Primary Examiner.*

H. W. TARRING, *Assistant Examiner.*